Nov. 29, 1960   J. Z. DE LOREAN   2,961,896
TRANSMISSION
Filed Aug. 12, 1957

INVENTOR.
John Z. DeLorean
BY
M. C. Middleton
ATTORNEY

United States Patent Office 2,961,896
Patented Nov. 29, 1960

2,961,896

TRANSMISSION

John Z. De Lorean, Birmingham, Mich., assignor to General Motors Corporation, Detroit, Mich., a corporation of Delaware Filed Aug. 12, 1957, Ser. No. 677,430

13 Claims. (Cl. 74—677)

This invention relates to automatic transmissions of the torque converter and planetary gear type.

An object of this invention is to provide an automatic transmission that is easily adaptable for connection with the drive shaft of the engine adjacent the engine or to be positioned adjacent the rear axle of the vehicle.

It is also an object of this invention to provide an economical automatic transmission comprising a hydraulic torque converter combined with a plurality of planetary gear sets.

It is a further object of this invention to eliminate the conventional "hump" normally present in the center of the passenger seating compartment of a motor vehicle; this hump being caused by the location of the transmission adjacent the rear end of the engine, the present invention providing a transmission located adjacent the rear axle.

Figure 1:
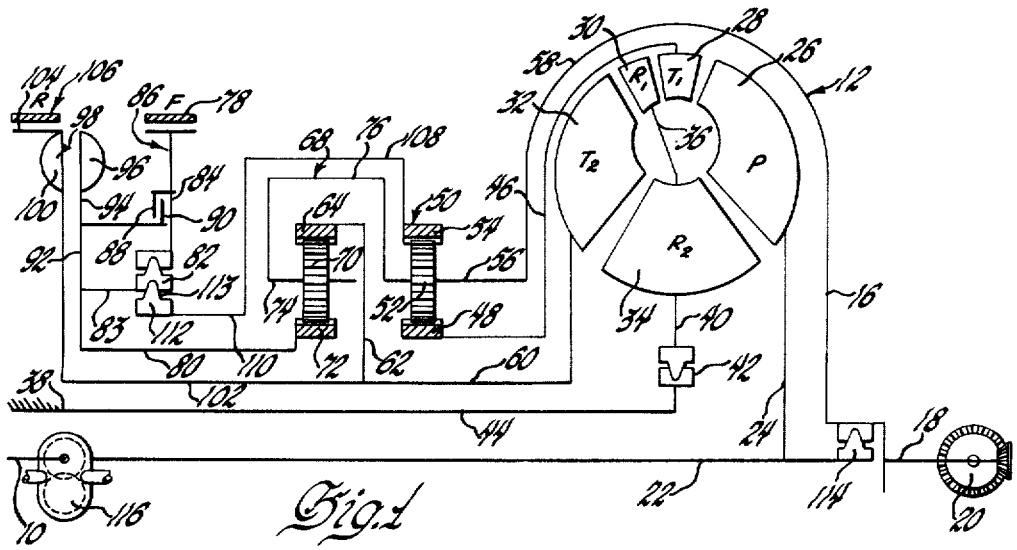
Figure 2:
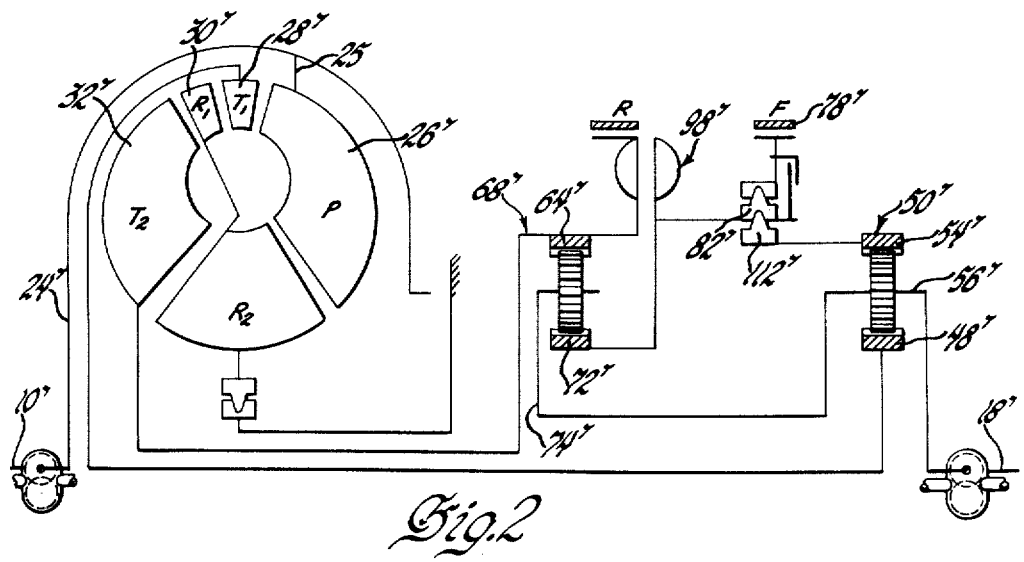

Other features, advantages and objects will become apparent by reference to the detailed description of the invention and to the drawings wherein:

Figure 1 is a schematic illustration of a preferred transmission embodying this invention, and Figure 2 is a modification of the transmission of Figure 1.

Referring now to the drawings and more particularly to Figure 1, wherein there is shown an input shaft 10 driving a torque converter 12 in turn driving a plurality of planetary gear sets 14 to drive an output shaft 16 connected with a shaft 18 driving the rear axle 20 for the wheels to be driven.

Drive or input shaft 10, which may be driven by any suitable source of power, such as an internal combustion engine (not shown), is connected by means of drive shaft extensions 22 and 24 to the rotatable pump element 26 of the torque converter 12 having in the path of fluid flow a first rotatable turbine 28, a first rotatable stator or reaction element 30, a second rotatable turbine element 32 and a second rotatable stator element 34. Stator elements 30 and 34 are connected by a connection 36, and are both connected to the transmission casing at 38 by means of a drive connection 40, a one-way braking device 42 and connection 44. The one-way device 42 acts in a manner to prevent reverse rotation of the stator elements 30 and 34 with respect to the forward rotation of pump element 26, while permitting overrun or overtravel of the stator elements in the same direction of rotation as the pump.

The blades of the torque converter elements are so shaped that fluid leaving pump element 26 will strike first turbine element 28 in a manner to cause forward rotation of the same or rotation in the same direction as the pump. Fluid leaving turbine 28, at low speeds of pump 26, will strike stator 30 in a manner to attempt to rotate stator 30 in a reverse direction; however, because of connection 36 to stator 34 and one-way brake 42, this reverse rotation is prevented. Fluid leaving stator 30 will strike the blades of second turbine 32 in a manner to drive it in a forward direction, and in a manner similar to the action of first stator 30, fluid leaving turbine 32 and striking stator 34 will likewise attempt to rotate stator 34 in a reverse direction, which is prevented. Fluid leaving stator 34 is then turned and enters pump 26 in a favorable direction aiding the rotation of the pump. At higher speeds of the pump, the fluid leaving the turbines 28 and 32 will strike the stators 30 and 34, respectively, at a more favorable angle to change the direction of rotation and cause these stators to rotate in a forward direction, which is permitted by one-way brake 42. Thus, at higher pump speeds, all of the rotating elements of the torque converter are rotating in a forward direction.

Connected to the first turbine 28 by means of drive connection 46 surrounding and enclosing first stator 30 and second turbine 32 is the sun gear driving member 48 of a first planetary gear set 50 having a plurality of planet pinions 52 meshing therewith and in turn meshing with a ring or internal gear 54. Rotatably supporting pinions 52 is a carrier member 56 having an extension 58 rotatably surrounding and enclosing torque converter 12 and being formed integrally with the output or driven shaft 16 for driving the rear axle 20.

Connected to the second turbine 32 by means of drive sleeve 60 and connection 62 is the ring gear 64 of a second planetary gear set 68 having a plurality of planet pinions 70 meshing therewith and with a sun gear 72. Rotatably supporting pinions 70 is a carrier member 74 having a connection 76 to the carrier 56 of the first planetary gear unit, thus providing a connection between the two driven members of the gear units and the output shaft 16.

A brake means 78 is adapted to be connected to sun gear 72 by means of a sleeve 80, a one-way engaging device 82 and connection 84, the one-way engaging device 82 preventing reverse rotation of sun gear 72 with respect to the direction of rotation of pump 26 while permitting overrun or overtravel of the sun gear 72 in the same direction as that of the pump.

The ring gear 54 of the first planetary gear set 50 is also adapted to be connected to the first brake 78 by means of a connection 108 and 110 to a second one-way engaging device 112 having one-way device 113 engaging with the inner race 83 of the first one-way engaging device 82. The arrangement of the one-way engaging devices 82 and 112 is such that rearward rotation of ring gear 54 with respect to the direction of rotation of pump 26 is prevented by the one-way device 112 since device 82 is also prevented from rotating reversely with brake 78 engaged. However, forward rotation of ring gear 54 is permitted upon release of one-way device 112 with one-way device 82 still engaged. It will also be noted that the two one-way engaging devices 82 and 112 may act at times as clutches, as will also be described during the description of the operation of the mechanism.

Connected also to the brake means 78 by connection 84 is an overrun or coast brake 86 having a plurality of friction disk plates 88 attached to connection 84 and mating with a plurality of friction disk plates 90 attached to an extension 92 of the sleeve shaft 80. The brake 86, when engaged, prevents rotation of the sun gear 72 in either direction of rotation to provide a retarding effect on overrun of the output shaft 16.

Attached to a further extension 94 of the sun gear sleeve 80 is the rotatable turbine or rotor 96 of a fluid coupling 98 having an impeller or pump element 100 adapted for cooperation with said turbine 96 and attached to be driven by the second turbine 32 by means of an extension 102 of sleeve shaft 60. This coupling is of the "fill and empty" type wherein filling of the coupling with fluid conditions the same for operation to act substantially or approximately as a clutch with the emptying of fluid from the coupling rendering the coupling inoperative as such. While no means is shown for filling and emptying this coupling 98, it is obvious that any conventional means may be employed.

Attached to the impeller element 100 of coupling 98 is one part 104 of a second brake element 106, adapted when engaged to provide a reverse drive through this transmission, as will be described hereinafter.

It will be seen in Figure 1 that the engine or drive shaft 10 is connected to output or driven shaft 18 by a one-way device 114, said device permitting overrun or overtravel of the drive shaft 10 with respect to the output shaft 18, while engaging to permit the driven shaft 18 to drive the drive shaft 10 at the same speed, e.g., in the case when a push start of a stalled vehicle is desired. For this reason, a rear fluid pump is unnecessary and only a single pump 116 connected to the drive shaft 10 is provided for supplying the fluid necessary for the filling of the coupling 98, torque converter 12 and the engagement of brakes 78, 84 and 106.

OPERATION

Neutral

Upon disengagement of forward brake 78, reverse brake 106, and the emptying of coupling 98, the transmission will be incapable of transmitting a drive from the input shaft 10 to the output shaft 18 because of the lack of a reaction member for the gear set, the gear sets merely idling freely without transmitting any torque to the carriers 74 and 56 connected with the output shaft 16. It will also be noted that the one-way device 114 is disengaged with the vehicle stationary and the engine idling.

Forward

Upon application of brake 78 by fluid from input shaft pump 116 through suitable conduits (not shown), and upon rotation of input shaft 10 to rotate pump 26 forwardly, at low speeds first turbine 28 will be driven to drive first unit sun gear 48 forwardly. Since carrier 56 is connected to output shaft 16, the load on the output shaft acts to temporarily hold the carrier stationary to cause it to act as a reaction member thereby causing ring gear 54 to attempt to rotate in a reverse direction, this reverse rotation being prevented by the engagement of one-way devices 112 and 82. Since the ring gear 54 cannot rotate rearwardly, the carrier 56 is caused to rotate forwardly and at a reduced speed from that of the speed of input shaft 10. At this time, the first stator 30 will attempt to rotate in a reverse direction, such reverse rotaion being prevented by its connection to the casing at 38 through the second stator 34 and one-way device 42.

Upon further increase in speed of pump 26, the second turbine 32 will begin to rotate rotating the ring gear 64 of the second planetary gear set 68 to increase the speed of rotation of the carrier 74 which is already being rotated by its connection with the carrier 56. Sun gear 72 is prevented from rotating reversely because of the engagement of one-way device 82, and therefore acts as a reaction member for the second gear set 68. At this time, the sun gear 48 of the first gear set 50 will be rotated forwardly at approximately an overdrive ratio by the carrier 56 and the primary driving force will be changed from the first turbine 28 driving through the first set 50 to the second turbine 32 driving through the second gear set 68 and the carrier of gear set 50 to produce a different forward speed ratio to the output shaft 16, the first gear set 50 at this time merely idling.

At this time, ring gear 54 of the first unit 50 will begin to rotate forwardly, such forward rotation being permitted by the disengagement of the one-way device 112 from the one-way device 82.

At any desired time, by suitable controls not shown, the coupling 98 may be filled with fluid causing the ring gear 64 and sun gear 72 of the second gear unit 68 to be rotated at approximately the same speed thereby providing substantially a direct drive from the input shaft 10 to the output shaft 18, the variance from a direct drive being due to the inherent slip in the coupling 98 and torque converter 12.

Reverse

Application of reverse brake 106 with release of forward brake 78, and emptying of the coupling 98, will cause the second turbine 32 and the ring gear 64 of the second set 68 to be held stationary thereby providing a reaction member for the second gear unit 68. Thereafter, upon forward rotation of pump 26, first turbine 28 will rotate sun gear 48 forwardly. With the load on shaft 18 causing carrier 56 of the first unit 50 to be held stationary temporarily, ring gear 54 will be rotated in a reverse direction thereby causing the one-way devices 112 and 82 to engage and act as a clutch to drive sun gear 72 in reverse. With ring gear 64 stationary, reverse rotation of sun gear 72 will cause carriers 74 and 56 to be rotated reversely, thus driving output shaft 16 in a reverse direction and at a speed reduced from the speed of input shaft 10.

Coast and braking

Under normal forward driving conditions with only forward brake 78 applied, coasting of the vehicle wherein shaft 18 tends to overrun input shaft 10 causes releasing of the one-way devices 82 and 112 by the carriers 56 and 74 driving the ring gear 54 and sun gear 72 forwardly thereby permitting the gear set to idle freely. However, upon application of coast brake 84 to hold sun gear 72 stationary under all conditions of rotation, overrun of output shaft 18 will be retarded or braked by a positive drive having been permanently established in the gear set 68. It is to be noted also that the one-way device 114 will engage to provide an engine braking effect whenever the shaft 18 attempts to overrun the input shaft 10. If further braking is desired, the operator may begin to fill coupling 98. Since turbine 96 is held stationary by coast brake 84, a churn brake effect will be established by the pump 100 attempting to rotate the turbine through the fluid medium.

Referring now to Figure 2, there is shown therein a modification of the transmission of Figure 1 to adapt the Figure 1 embodiment for installation directly behind the engine of a motor vehicle instead of adjacent the rear axle. This modification shown in Figure 2 varies from the Figure 1 construction only in the arrangement of the drive shaft 10' from the engine to its connection with the pump element 26', and the corresponding arrangement of the sleeve connections to the gear set. In Figure 2, the drive shaft 10' is shown having an extension 24' surrounding and enclosing the second turbine 32', first stator 30' and first turbine 28' and being connected to the pump 26' by drive connection 25. The connections from the torque converter to the gear sets remain the same, except for physical location, as in the Figure 1 modification, and therefore will not be repeated except to reiterate that the first turbine 28' is connected to the sun gear 48' of the first gear set 50', the second turbine 32' is connected to the ring gear 64' of the second gear unit 68', the sun gear 72' of the second unit and the ring gear 54' of the first unit are connected together and to a brake 78' by means of one-way devices 82' and 112', the two carriers 56' and 74' are connected to each other and to the output shaft 18', and a fluid coupling 98' of the fill and empty type is connected to the sun gear 72' and ring gear 64' of the second unit 68' for providing approximately a direct drive from the input shaft 10' to the output shaft 18' and for providing increased braking.

From the foregoing it will be seen that applicant has provided a transmission that is adapted to be placed adjacent the rear axle of the vehicle to be driven, with the resultant effect that the hump in the passenger seating compartment caused by the transmission housing is eliminated. It will further be seen that applicant has provided a transmission having an infinite number of forward speed ratios, neutral and a reverse ratio by the combination of a multi-element torque converter with a plurality of planetary gear sets. It will also be seen that applicant has provided a transmission capable of being varied structurally with a minimum amount of effort to adapt the transmission to be placed immediately adjacent the rear end of the engine. It will be understood that the invention can be modified beyond the illustrated embodiments, and therefore, any limitations to be imposed are those set forth in the following claims.

I claim:

1. A transmission comprising an input shaft, an output shaft, and means connecting said shafts, said means including a hydrodynamic drive device and gear means, said drive device including a rotatable pump element connected to said input shaft and a plurality of rotatable turbine elements, means for holding one of said turbine elements stationary in at least one direction of rotation, said gear means including a plurality of planetary gear sets each having drive, driven and reaction members, means connecting another of said turbine elements with the drive member of one of said gear sets, means connecting a further turbine element with the reaction member of another of said gear sets, means connecting the driven members of said gear sets to each other and to said output shaft, clutch means connecting another of said members of said one gear set to the drive member of said other gear set, and brake means for preventing rotation of said further turbine element and the reaction member of said other gear set, application of said brake means for said reaction member upon rotation of said pump element in a forward direction of rotation causing reverse rotation of said driven members of gear sets to drive said output shaft in a direction opposite to the direction of rotation of said pump.

2. A transmission as in claim 1, wherein said clutch means comprises a one-way engaging device.

3. A transmission comprising an input shaft, an output shaft, and means connecting said shafts for providing a plurality of forward speeds, neutral and reverse, said means including a hydrodynamic drive device and gear means, said drive device including a rotatable pump element connected to said input shaft and a plurality of rotatable turbine elements, said gear means including a plurality of planetary gear sets each having a ring gear, a sun gear, planet pinions meshing with said ring and sun gears, and a carrier member rotatably supporting said pinions, a first one of said turbine elements being connected to the sun gear of a first gear set, means for holding a second turbine element from rotation in at least one direction, means connecting a third one of said turbine elements to the ring gear of a second gear set, said second turbine element being positioned between said first and third turbine elements in the path of fluid flow, means connecting the carrier members of said first and second gear sets to each other and to said output shaft, and brake means for holding the ring gear of said first gear set and the sun gear of said second gear set stationary, second brake means for holding the ring gear of said second gear set and said turbine element stationary, and clutch means for connecting said second set ring gear and sun gear for providing substantially a direct drive through said second gear set, application of the gear set first brake means upon forward rotation of said pump causing forward rotation of said first and third turbine elements with said second turbine element being held stationary to cause driving of said first unit sun gear and second unit ring gear causing said carrier members and said output shaft to be driven in a forward direction and at a speed reduced from the speed of rotation of said pump, application of said clutch means upon release of said gear set first brake means and forward rotation of said pump element causing forward rotation of said three turbine elements to effect forward rotation of said carriers and said output shaft at a speed approximately equal to the speed of rotation of said pump element, application of said gear set second brake means upon release of said gear set first brake means and said clutch means and forward rotation of said pump element effecting holding of said second and third turbine elements from rotation and the driving of said carrier members and said output shaft in a direction opposite to the direction of rotation of said pump element.

4. A transmission as in claim 3, wherein said gear set first brake means includes a plurality of one-way clutches connected to each other, one of said one-way clutches being connected to the ring gear of said first gear set, a second one of said clutches being connected to the sun gear of said second gear set, engagement of said gear set second brake means upon release of said gear set first brake means causing engagement of said one-way clutches upon forward rotation of said pump and first turbine elements to drive said second unit sun gear from said first unit ring gear to drive said carriers and said output shaft in a direction opposite to the direction of rotation of said pump element.

5. A transmission as in claim 3, wherein said clutch means comprises a second hydrodynamic drive device capable of being filled and emptied of fluid, said second drive device having an impeller connected to the ring gear of said second gear set and a turbine element connected to the sun gear of said second gear set, the filling of said second drive device providing approximately a direct drive through said second gear set.

6. A transmission as in claim 3, wherein said gear set first brake means includes means engageable to prevent rotation of said first unit ring gear and second unit sun gear in both directions of rotation.

7. A transmission having an input shaft, an output shaft, and means connecting said shafts, said means comprising a hydraulic torque converter and gear means, said torque converter including a pump element rotatable with said input shaft, a plurality of rotatable turbine elements and a plurality of stator or reaction elements, means for holding said stator elements stationary in at least one direction of rotation, one of said stator elements being positioned between two of said rotatable turbine elements in the path of fluid flow, another of said stator elements being positioned between one of said two turbine elements and said pump element in the path of fluid flow, said gear means including a plurality of planetary gear sets, said gear sets having drive, driven and reaction members, means connecting one of said turbine elements to a drive member of one of said gear sets, means connecting another of said turbine elements to a drive member of another of said gear sets, means connecting the driven members of said gear sets to each other and to said output shaft, and brake means for holding said reaction members of both of said gear sets stationary, said brake means including one-way devices releasable for permitting rotation of said reaction members in at least one direction, application of said brake means upon forward rotation of said pump element at low speeds of said pump element causing forward rotation of said turbine elements and engagement of said stator element brake means and said one-way devices to effect drive of said driven members and said output shaft in a forward direction and at a speed reduced from the speed of said pump element, rotation of said pump element in a forward direction at higher speeds effecting forward rotation of said turbine elements and said stator elements to effect release of said one-way devices to permit forward rotation of said driven members and said output shaft at a speed approximately equal to the speed of said pump element.

8. A transmission comprising an input shaft, an output shaft, and means connecting said shafts, said means comprising, a hydrodynamic drive device and gear means, said drive device including a rotatable pump element connected to said input shaft and a plurality of rotatable turbine elements, said gear means including a plurality of planetary gear sets, each having a plurality of rotatable members, means connecting a first one of said turbine elements and one of the rotatable members of a first gear set, means for holding a second one of said turbine elements stationary in at least one direction of rotation, means connecting a third one of said turbine elements to one of said rotatable members of a second gear set, said second turbine element being positioned between said first and third turbine elements in the path of fluid flow, means connecting another of the rotatable members of said one gear set to another rotatable member of said second gear set and to said output shaft, first brake means for holding said one rotatable member of said second gear set stationary, second brake means for holding a third rotatable member of said second gear set and a third rotatable member of said first gear set stationary to provide a reduction drive in said gear sets, application of said second brake means upon slow forward rotation of said pump element causing said second turbine element to be held stationary and said first and third turbine elements to be rotated in a forward direction to cause said second connected rotatable members to be driven in a forward direction to drive said output shaft forwardly and at a speed reduced from the speed of said pump element, faster forward rotation of said pump element causing release of said second turbine element brake means causing drive of said output shaft in a forward direction and at a speed greater than with said turbine element brake means applied, said second brake means including clutch means, application of said first brake means upon release of said second brake means and rotation of said pump element is a forward direction causing forward rotation of said first turbine element to engage said clutch means to cause said second rotatable members to be driven in a reverse direction driving said output shaft in a direction opposite to the direction of rotation of said pump element and at a reduced speed thereto.

9. A transmission comprising an input shaft, an output shaft, and means connecting said shafts, said means comprising a hydrodynamic drive device and gear means, said drive device including a rotatable pump element connected to said input shaft and a plurality of rotatable turbine elements, said gear means including a plurality of planetary gear sets, each having a plurality of rotatable members, means connecting a first one of said turbine elements and one of the rotatable members of a first gear set, means for holding a second one of said turbine elements stationary in at least one direction of rotation, means connecting a third one of said turbine elements to one of said rotatable members of a second gear set, said second turbine element being positioned between said first and third turbine elements in the path of fluid flow, means connecting another of the rotatable members of said one gear set to another rotatable member of said second gear set and to said output shaft, first brake means for holding said one rotatable member of said second gear set stationary, second brake means for holding a third rotatable member of said second gear set and a third rotatable member of said first gear set stationary to provide a reduction drive in said gear sets, application of said second brake means upon slow forward rotation of said pump element causing said second turbine element to be held stationary and said first and third turbine elements to be rotated in a forward direction to cause said second connected rotatable members to be driven in a forward direction to drive said output shaft forwardly and at a speed reduced from the speed of said pump element, faster forward rotation of said pump element causing release of said second turbine element brake means causing drive of said output shaft in a forward direction and at a speed greater than with said turbine element brake means applied, said second brake means including a plurality of one-way devices, each of said devices being connected to a separate one of said third rotatable members.

10. A transmission comprising an input shaft, an output shaft, and means connecting said shafts, said means comprising a hydrodynamic drive device and gear means, said drive device including a rotatable pump element connected to said input shaft and a plurality of rotatable turbine elements, said gear means including a plurality of planetary gear sets, each having a plurality of rotatable members, means connecting a first one of said turbine elements and one of the rotatable members of a first gear set, means for holding a second one of said turbine elements stationary in at least one direction of rotation, means connecting a third one of said turbine elements to one of said rotatable members of a second gear set, said second turbine element being positioned between said first and third turbine elements in the path of fluid flow, means connecting another of the rotatable members of said one gear set to another rotatable member of said second gear set and to said output shaft, first brake means for holding said one rotatable member of said second gear set stationary, second brake means for holding a third rotatable member of said second gear set and a third rotatable member of said first gear set stationary to provide a reduction drive in said gear sets, application of said second brake means upon slow forward rotation of said pump element causing said second turbine element to be held stationary and said first and third turbine elements to be rotated in a forward direction to cause said second connected rotatable members to be driven in a forward direction to drive said output shaft forwardly and at a speed reduced from the speed of said pump element, faster forward rotation of said pump element causing release of said second turbine element brake means causing drive of said output shaft in a forward direction and at a speed greater than with said turbine element brake means applied, said second brake means including a plurality of one-way devices connected to each other and to said third rotatable members of said first and second gear sets.

11. A transmission comprising an input shaft, an output shaft, and means connecting said shafts, said means comprising a hydrodynamic drive device and gear means, said drive device including a rotatable pump element connected to said input shaft and a plurality of rotatable turbine elements, said gear means including a plurality of planetary gear sets, each having a plurality of rotatable members, means connecting a first one of said turbine elements and one of the rotatable members of a first gear set, means for holding a second one of said turbine elements stationary in at least one direction of rotation, means connecting a third one of said turbine elements to one of said rotatable members of a second gear set, said second turbine element being positioned between said first and third turbine elements in the path of fluid flow, means connecting another of the rotatable members of said one gear set to another rotatable member of said second gear set and to said output shaft, first brake means for holding said one rotatable member of said second gear set stationary, second brake means for holding a third rotatable member of said second gear set and a third rotatable member of said first gear set stationary to provide a reduction drive in said gear sets, application of said second brake means upon slow forward rotation of said pump element causing said second turbine element to be held stationary and said first and third turbine elements to be rotated in a forward direction to cause said second connected rotatable members to be driven in a forward direction to drive said output shaft forwardly and at a speed reduced from the speed of said pump element, faster forward rotation of said pump element causing release of said second turbine element brake means causing drive of said output shaft in a forward direction and at a speed greater than with said turbine element brake means applied, said second brake means including a friction brake means operable to hold one of said third rotatable members stationary in both directions of rotation.

12. A transmission comprising an input shaft, an output shaft, and means connecting said shafts, said means comprising a hydrodynamic drive device and gear means, said drive device including a rotatable pump element connected to said input shaft and a plurality of rotatable turbine elements, said gear means including a plurality of planetary gear sets, each having a plurality of rotatable members, means connecting a first one of said turbine elements and one of the rotatable members of a first gear set, means for holding a second one of said turbine elements stationary in at least one direction of rotation, means connecting a third one of said turbine elements to one of said rotatable members of a second gear set, said second turbine element being positioned between said first and third turbine elements in the path of fluid flow, means connecting another of the rotatable members of said one gear set to another rotatable member of said second gear set and to said output shaft, first brake means for holding said one rotatable member of said second gear set stationary, second brake means for holding a third rotatable member of said second gear set and a third rotatable member of said first gear set stationary to provide a reduction drive in said gear sets, application of said second brake means upon slow forward rotation of said pump element causing said second turbine element to be held stationary and said first and third turbine elements to be rotated in a forward direction to cause said second connected rotatable members to be driven in a forward direction to drive said output shaft forwardly and at a speed reduced from the speed of said pump element, faster forward rotation of said pump element causing release of said second turbine element brake means causing drive of said output shaft in a forward direction and at a speed greater than with said turbine element brake means applied, and second clutch means for connecting the first and third rotatable members of said second gear set for providing substantially a direct drive through said gear set.

13. A transmission as in claim 12, wherein said second clutch means comprises a second hydrodynamic drive device, said second drive device capable of being filled and emptied of fluid, the filling of said device providing substantially a direct drive through said gear set.

References Cited in the file of this patent
UNITED STATES PATENTS

| | | |
|---|---|---|
| 2,737,827 | Seybold | Mar. 13, 1956 |
| 2,749,777 | Simpson | June 12, 1956 |
| 2,768,537 | Seybold | Oct. 30, 1956 |
| 2,803,974 | Kelley | Aug. 27, 1957 |
| 2,884,809 | Moore | May 5, 1959 |